(12) United States Patent
Fukuhara et al.

(10) Patent No.: US 10,581,356 B2
(45) Date of Patent: Mar. 3, 2020

(54) EXHAUST TURBINE POWER GENERATING SYSTEM AND CONTROL DEVICE FOR THE SAME

(71) Applicant: TOYOTA JIDOSHA KABUSHIKI KAISHA, Toyota-shi, Aichi-ken (JP)

(72) Inventors: Yoshiki Fukuhara, Susono (JP); Masakazu Tabata, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/941,749

(22) Filed: Mar. 30, 2018

(65) Prior Publication Data

US 2018/0287535 A1 Oct. 4, 2018

(30) Foreign Application Priority Data

Apr. 3, 2017 (JP) .................. 2017-073868

(51) Int. Cl.
*H02P 9/08* (2006.01)
*F01N 5/04* (2006.01)
*F02D 29/06* (2006.01)
*F02D 41/06* (2006.01)

(52) U.S. Cl.
CPC .......... *H02P 9/08* (2013.01); *F01N 5/04* (2013.01); *F02D 29/06* (2013.01); *F02D 41/062* (2013.01); *Y02T 10/16* (2013.01); *Y02T 10/163* (2013.01)

(58) Field of Classification Search
CPC ... H02P 9/08; F01N 5/04; F02D 29/06; F02D 41/062; Y02T 10/16; Y02T 10/163
See application file for complete search history.

(56) References Cited

U.S. PATENT DOCUMENTS

| 4,886,978 | A | * | 12/1989 | Kawamura | F02B 41/10 290/52 |
| 9,080,523 | B1 | * | 7/2015 | Ulrey | F02D 13/0242 |
| 9,347,353 | B2 | * | 5/2016 | Yoshioka | F01N 3/2013 |
| 9,356,215 | B2 | * | 5/2016 | Iriyama | F01N 5/025 |

(Continued)

FOREIGN PATENT DOCUMENTS

| JP | 2014-020364 A | 2/2014 |
| JP | 2015-021448 A | 2/2015 |
| JP | 20150140695 A | 8/2015 |

*Primary Examiner* — Tulsidas C Patel
*Assistant Examiner* — Joseph Ortega
(74) *Attorney, Agent, or Firm* — Hunton Andrews Kurth LLP

(57) ABSTRACT

An exhaust turbine power generating system includes an internal combustion engine, an exhaust turbine power generator configured to perform electric power generation by rotating a turbine by using exhaust gas from the internal combustion engine, and an electronic control unit. The electronic control unit is configured to perform electric power generation control in which the exhaust turbine power generator is caused to perform electric power generation by controlling the exhaust turbine power generator and the electronic control unit is configured to perform powering control in which the exhaust turbine power generator is caused to perform powering such that the turbine is rotated by controlling the exhaust turbine power generator until a predetermined termination condition is satisfied after the internal combustion engine is started.

7 Claims, 12 Drawing Sheets

(56) References Cited

U.S. PATENT DOCUMENTS

| | | | |
|---|---|---|---|
| 2004/0214689 A1* | 10/2004 | Kaneko | F02D 17/04 477/203 |
| 2007/0062191 A1* | 3/2007 | Furman | B60K 6/24 60/607 |
| 2007/0151241 A1* | 7/2007 | Arnold | B60K 6/26 60/605.1 |
| 2009/0107142 A1* | 4/2009 | Russell | F02B 33/40 60/608 |
| 2014/0053547 A1* | 2/2014 | Wade | F02B 37/04 60/599 |
| 2015/0038292 A1* | 2/2015 | Tokura | F02M 35/1038 477/33 |
| 2015/0204257 A1* | 7/2015 | Osumi | F02D 41/0062 123/564 |
| 2015/0240685 A1* | 8/2015 | Morishima | F01N 13/009 60/274 |
| 2015/0292422 A1* | 10/2015 | Tsunooka | F02B 37/183 60/602 |
| 2015/0316005 A1* | 11/2015 | Madison | F02M 26/04 60/602 |
| 2015/0330265 A1* | 11/2015 | Haga | F01L 1/46 123/90.16 |
| 2015/0369149 A1* | 12/2015 | Matsubara | F02D 41/0007 701/103 |
| 2016/0108798 A1* | 4/2016 | VanDerWege | F02D 41/0087 60/602 |
| 2016/0131046 A1* | 5/2016 | Leone | F02B 37/004 60/600 |
| 2016/0131054 A1* | 5/2016 | Ulrey | F01N 5/04 60/600 |
| 2016/0230648 A1* | 8/2016 | Sanchez Perez | F02D 41/0007 |
| 2016/0265385 A1* | 9/2016 | Annati | F01D 25/16 |
| 2016/0281648 A1* | 9/2016 | Annati | F01D 25/16 |
| 2016/0312687 A1* | 10/2016 | Kemmerling | F02B 37/002 |
| 2017/0122234 A1* | 5/2017 | Kuechler | F02D 41/123 |
| 2017/0226942 A1* | 8/2017 | Denner | B60K 13/02 |
| 2017/0260915 A1* | 9/2017 | Zhang | F02M 26/71 |
| 2017/0328272 A1* | 11/2017 | Yamashita | F02B 37/24 |
| 2017/0356332 A1* | 12/2017 | Kubo | F02B 37/013 |
| 2018/0001984 A1* | 1/2018 | Yamashita | B63H 21/14 |
| 2018/0058283 A1* | 3/2018 | Bailey | F01N 3/2066 |
| 2018/0148038 A1* | 5/2018 | Ulrey | B60W 50/0205 |
| 2018/0171917 A1* | 6/2018 | Ulrey | F02M 26/14 |
| 2019/0048792 A1* | 2/2019 | Yamashita | H02K 11/25 |
| 2019/0078520 A1* | 3/2019 | Inoue | F02D 19/12 |

* cited by examiner

EXHAUST TURBINE POWER GENERATING SYSTEM AND CONTROL DEVICE FOR THE SAME

INCORPORATION BY REFERENCE

The disclosure of Japanese Patent Application No. 2017-073868 filed on Apr. 3, 2017 including the specification, drawings and abstract is incorporated herein by reference in its entirety.

BACKGROUND

1. Technical Field

The present disclosure relates to an exhaust turbine power generating system that performs electric power generation by using exhaust energy from an internal combustion engine and relates to a control device for the exhaust turbine power generating system.

2. Description of Related Art

Japanese Unexamined Patent Application Publication No. 2014-020364 (JP 2014-020364 A) discloses an internal combustion engine that performs electric power generation by using exhaust gas. Specifically, a generator is connected to a rotary shaft of an exhaust turbine that is rotated by the exhaust gas. The internal combustion engine measures the rotation rate of the exhaust turbine. The internal combustion engine does not operate the generator until the measured value exceeds a threshold value set in advance. In a case where the measured value exceeds the threshold value set in advance, the internal combustion engine operates the generator and performs electric power generation.

Japanese Unexamined Patent Application Publication No. 2015-021448 (JP 2015-021448 A) discloses an exhaust turbine power generating system in which an exhaust gas flow path is divided into two systems. Exhaust gas in a blowdown stream is supplied to a turbine unit in an exhaust turbine power generator through a first exhaust gas flow path. Exhaust gas in a scavenging stream flows through a second exhaust gas flow path while bypassing the turbine unit.

SUMMARY

According to a technique disclosed in JP 2014-020364 A, when the rotation rate of the exhaust turbine exceeds the threshold value set in advance, the generator performs electric power generation. In the electric power generation control as described above, it is not possible to start electric power generation at an early stage since the rotation rate of the exhaust turbine is relatively low at a time immediately after the start of the internal combustion engine (including restart). This means a decrease in electric power generation opportunity, which is not preferable.

The present disclosure provides a technique with which it is possible to achieve an increase in electric power generation opportunity after the start of an internal combustion engine in an exhaust turbine power generating system that performs electric power generation by using exhaust energy from the internal combustion engine.

A first aspect of the present disclosure relates to an exhaust turbine power generating system including an internal combustion engine, an exhaust turbine power generator, and an electronic control unit. The exhaust turbine power generator is configured to perform electric power generation by rotating a turbine by using exhaust gas from the internal combustion engine. The electronic control unit is configured to perform electric power generation control in which the exhaust turbine power generator is caused to perform electric power generation by controlling the exhaust turbine power generator. The electronic control unit is configured to perform powering control in which the exhaust turbine power generator is caused to perform powering such that the turbine is rotated by controlling the exhaust turbine power generator until a predetermined termination condition is satisfied after the internal combustion engine is started.

In the exhaust turbine power generating system according to the first aspect of the present disclosure, the electronic control unit may be configured to perform the powering control without performing the electric power generation control until a predetermined switch start condition is satisfied after the internal combustion engine is started. The electronic control unit may be configured to perform switch control in which the electric power generation control and the powering control are alternately performed until the predetermined termination condition is satisfied after the internal combustion engine is started and the predetermined switch start condition is satisfied.

In the exhaust turbine power generating system according to the first aspect of the present disclosure, the electronic control unit may be configured to perform the electric power generation control in at least a portion of a blowdown period of the internal combustion engine when performing the switch control. The blowdown period may be a period within an exhaust cycle of the internal combustion engine in which a blowdown stream of the exhaust gas from an arbitrary cylinder in the internal combustion engine to the turbine is generated, the exhaust cycle may be a period between two temporally consecutive exhaust start timings, and the exhaust start timing may be a timing at which the exhaust gas starts to be discharged toward the turbine from an arbitrary cylinder in the internal combustion engine.

In the exhaust turbine power generating system according to the first aspect of the present disclosure, the electronic control unit may be configured to change the timing to switch between the electric power generation control and the powering control in the switch control according to the rotation rate of the turbine.

In the exhaust turbine power generating system according to the first aspect of the present disclosure, the predetermined switch start condition may be a condition that a turbine rotation rate, which is the rotation rate of the turbine, reaches a switch start rotation rate. The predetermined termination condition may be a condition that the turbine rotation rate reaches a powering termination rotation rate that is greater than the switch start rotation rate.

In the exhaust turbine power generating system according to the first aspect of the present disclosure, the electronic control unit may be configured to perform the electric power generation control without performing the powering control in a case where the predetermined termination condition is satisfied.

A second aspect of the present disclosure relates to a control device for an exhaust turbine power generating system which includes an internal combustion engine and an exhaust turbine power generator configured to perform electric power generation by rotating a turbine by using exhaust gas from the internal combustion engine. The control device includes an electronic control unit. The electronic control unit is configured to perform electric power generation control in which the exhaust turbine power generator is caused to perform electric power generation by controlling the exhaust turbine power generator. The electronic control unit is configured to perform powering control in which the exhaust turbine power generator is caused to perform powering such that the turbine is rotated by controlling the exhaust turbine power generator until a predetermined termination condition is satisfied after the internal combustion engine is started.

According to the first aspect of the present disclosure, the electronic control unit performs the powering control of the exhaust turbine power generator until the predetermined termination condition is satisfied after the internal combustion engine is started. Accordingly, the turbine rotation rate of the exhaust turbine power generator is increased more rapidly. That is, it is possible to more rapidly increase the turbine rotation rate to an electric power generation possible rotation rate and it is possible to start electric power generation at an early stage. As a result, there is an increase in electric power generation opportunity and electric power generation amount after the start of the internal combustion engine.

According to the first aspect of the present disclosure, the electronic control unit performs the powering control without performing the electric power generation control until the predetermined switch start condition is satisfied after the internal combustion engine is started. Accordingly, it is possible to effectively increase the turbine rotation rate. After the predetermined switch start condition is satisfied, the electronic control unit performs the switch control in which the electric power generation control and the powering control are alternately performed. Accordingly, it is possible to perform electric power generation while increasing the turbine rotation rate. That is, electric power generation opportunity and electric power generation amount are further increased.

According to the first aspect of the present disclosure, the electronic control unit performs the electric power generation control in at least a portion of the blowdown period, in which the blowdown stream is generated, when performing the switch control. Since the high-energy blowdown stream is effectively used, the electric power generation efficiency is improved and there is an increase in electric power generation amount. That is, it is possible to efficiently realize both of an increase in electric power generation amount and an increase in turbine rotation rate at an early stage in the switch control in which the electric power generation control and the powering control are alternately performed.

According to the first aspect of the present disclosure, the electronic control unit changes the timing to switch between the electric power generation control and the powering control in the switch control according to the turbine rotation rate. Accordingly, the switch control becomes more accurate, and thus it is possible to further improve the electric power generation efficiency.

According to the first aspect of the present disclosure, the electronic control unit can easily determine whether to start or terminate the switch control based on the turbine rotation rate.

According to the first aspect of the present disclosure, the electronic control unit performs the electric power generation control without performing the powering control in a case where the predetermined termination condition is satisfied. Accordingly, the turbine rotation rate is restrained from exceeding an electric power generation upper limit rotation rate.

According to the second aspect of the present disclosure, the same effect as in the first aspect of the present disclosure can be achieved.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

An embodiment of the present disclosure will be described with reference to attached drawings.

1. Exhaust Turbine Power Generating System

1-1. Entire Configuration

Figure 1:
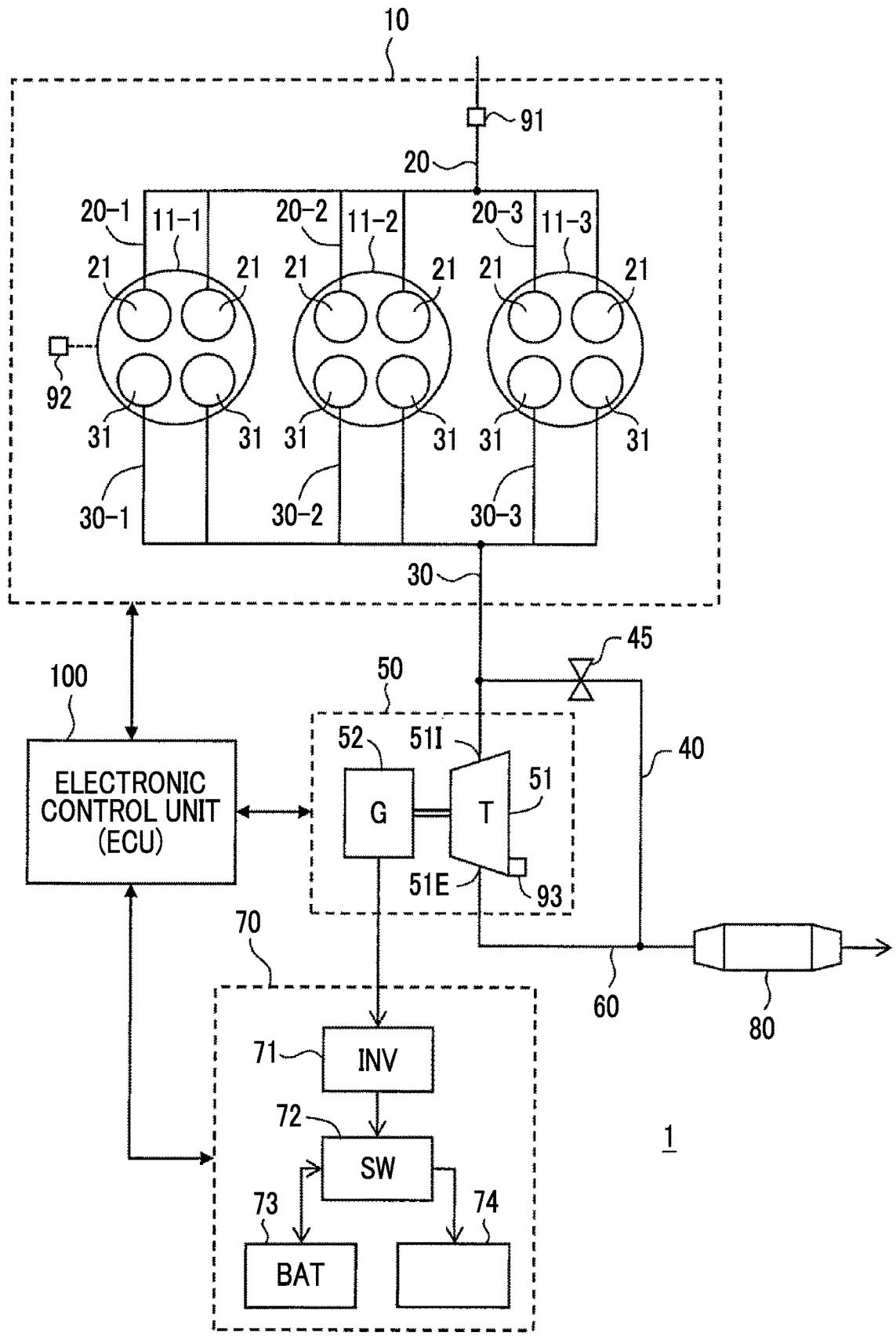
FIG. 1 is a schematic diagram illustrating an example of the configuration of an exhaust turbine power generating system according to the embodiment of the present disclosure.

FIG. 1 is a schematic diagram illustrating an example of the configuration of an exhaust turbine power generating system 1 according to the embodiment of the present disclosure. The exhaust turbine power generating system 1 includes an internal combustion engine 10 (engine), an exhaust turbine power generator 50, an electric device 70, and an electronic control unit 100 as main components.

The internal combustion engine 10 includes cylinders 11 (combustion chamber) in which combustion is performed. Although three cylinders 11-1, 11-2, 11-3 are illustrated in FIG. 1, the number of the cylinders 11 is optional. In each cylinder 11, a piston (not shown) is provided such that the piston can reciprocate vertically. The vertical reciprocating motion of the piston results in intake and exhaust.

An intake pipe 20 (intake port) is provided to supply intake gas to the cylinders 11. Opening portions of the intake pipe 20 with respect to the cylinders 11 are intake opening portions 21. That is, the intake pipe 20 is connected to the cylinders 11 via the intake opening portions 21. The intake opening portions 21 are provided with an intake valve (not shown) such that the intake valve can be opened and closed. Supply of intake gas to the cylinders 11 is controlled by controlling opening and closing of the intake valve. In an example illustrated in FIG. 1, intake pipes 20-$i$ are respectively connected to the cylinders 11-$i$ ($i=1$ to 3).

An exhaust pipe 30 (exhaust port) is provided to discharge exhaust gas from the cylinders 11. Opening portions of the exhaust pipe 30 with respect to the cylinders 11 are exhaust opening portions 31. That is, the exhaust pipe 30 is connected to the cylinders 11 via the exhaust opening portions 31. The exhaust opening portions 31 are provided with an exhaust valve (not shown) such that the exhaust valve can be opened and closed. Discharge of exhaust gas from the cylinders 11 is controlled by controlling the opening and closing of the exhaust valve. In the example illustrated in FIG. 1, exhaust pipes 30-$i$ are respectively connected to the cylinders 11-$i$ ($i=1$ to 3).

The exhaust turbine power generator 50 is connected to the exhaust pipe 30 and performs electric power generation by using exhaust gas from the internal combustion engine 10. More specifically, the exhaust turbine power generator 50 includes a turbine 51 and a generator 52 that is connected to an output shaft of the turbine 51. A gas inlet and a gas outlet of the turbine 51 are a turbine inlet portion 51I and a turbine outlet portion 51E, respectively. Exhaust gas from the internal combustion engine 10 is supplied to the turbine 51 through the turbine inlet portion 51I and the turbine 51 is rotated by the supplied exhaust gas. As the turbine 51 rotates, the generator 52 is driven and generates electric power. As described above, the exhaust turbine power generator 50 converts exhaust energy from the internal combustion engine 10 to electric energy.

The turbine outlet portion 51E of the turbine 51 is connected to a turbine downstream side exhaust pipe 60. Exhaust gas passing through the turbine 51 flows into the turbine downstream side exhaust pipe 60 from the turbine outlet portion 51E. A catalyst 80 for controlling exhaust gas is disposed in the middle of the turbine downstream side exhaust pipe 60.

A bypass exhaust pipe 40 that bypasses the turbine 51 is provided to directly connect the exhaust pipe 30 upstream of the turbine 51 and the turbine downstream side exhaust pipe 60 to each other. In order to adjust the amount of exhaust gas flowing in the bypass exhaust pipe 40, a bypass valve 45 is disposed in the bypass exhaust pipe 40.

The electric device 70 uses or stores electric power generated by the exhaust turbine power generator 50. More specifically, the electric device 70 includes an inverter 71, a switch 72, a battery 73, and an electrical load 74. Electric power generated by the exhaust turbine power generator 50 is supplied to the battery 73 or the electrical load 74 after being converted by the inverter 71. Switching between supply of the electric power to the battery 73 and supply of the electric power to the electrical load 74 can be performed by using the switch 72. It is also possible to supply electric power discharged from the battery 73 to the electrical load 74 by switching the switch 72. For example, in the case of a hybrid vehicle, the electrical load 74 includes a vehicle driving motor.

The electronic control unit 100 controls the operation of the internal combustion engine 10, the exhaust turbine power generator 50, and the electric device 70. Typically, the electronic control unit 100 is a microcomputer provided with a processor, a storage device, and an input and output interface. The electronic control unit 100 is also called an ECU. The storage device of the electronic control unit 100 stores a control program for performing various types of control. When the processor of the electronic control unit 100 performs the control program, the various types of control are realized.

More specifically, the internal combustion engine 10, the exhaust turbine power generator 50, and the electric device 70 are provided with a group of sensors that detects the operation state of each device. The electronic control unit 100 receives detection information indicating the operation state of each device from the group of sensors. The electronic control unit 100 controls the operation of the internal combustion engine 10 by controlling the timing of opening and closing of the throttle valve, the intake valve, and the exhaust valve, fuel injection, or the like based on the detection information. In addition, the electronic control unit 100 controls the operation of the exhaust turbine power generator 50 based on the detection information. Furthermore, the electronic control unit 100 controls charging and discharging of the battery 73 and supply of electric power to the electrical load 74 by controlling the inverter 71 and the switch 72 based on the detection information.

In the example illustrated in FIG. 1, an air flow meter 91, a crank angle sensor 92, and a turbine rotation rate sensor 93 are included in the group of sensors. The air flow meter 91 detects the amount of air Ga supplied to the internal combustion engine 10 and transmits detection information to the electronic control unit 100. The crank angle sensor 92 detects a crank angle and transmits detection information to the electronic control unit 100. The electronic control unit 100 calculates an engine rotation rate Ne based on the detection information from the crank angle sensor 92. The turbine rotation rate sensor 93 detects a turbine rotation rate Nt, which is the rotation rate of the turbine 51, and transmits detection information to the electronic control unit 100. As described below in detail, the electronic control unit 100 controls the operation of the exhaust turbine power generator 50 based on the above-described detection information.

1-2. Electric Power Generation Control and Powering Control

Control with respect to the exhaust turbine power generator 50 which is performed by the electronic control unit 100 according to the embodiment includes "electric power generation control" and "powering control". The electric power generation control is control for causing the exhaust turbine power generator 50 to perform electric power generation. That is, in the electric power generation control, electric power is generated with the generator 52 being driven by the turbine 51 that rotates by using exhaust gas from the internal combustion engine 10. Meanwhile, the powering control is control for causing the exhaust turbine power generator 50 to perform powering. That is, in the powering control, electric power is supplied to the generator 52 and the generator 52 functions as an electric motor such that the turbine 51 is rotated.

Figure 2:
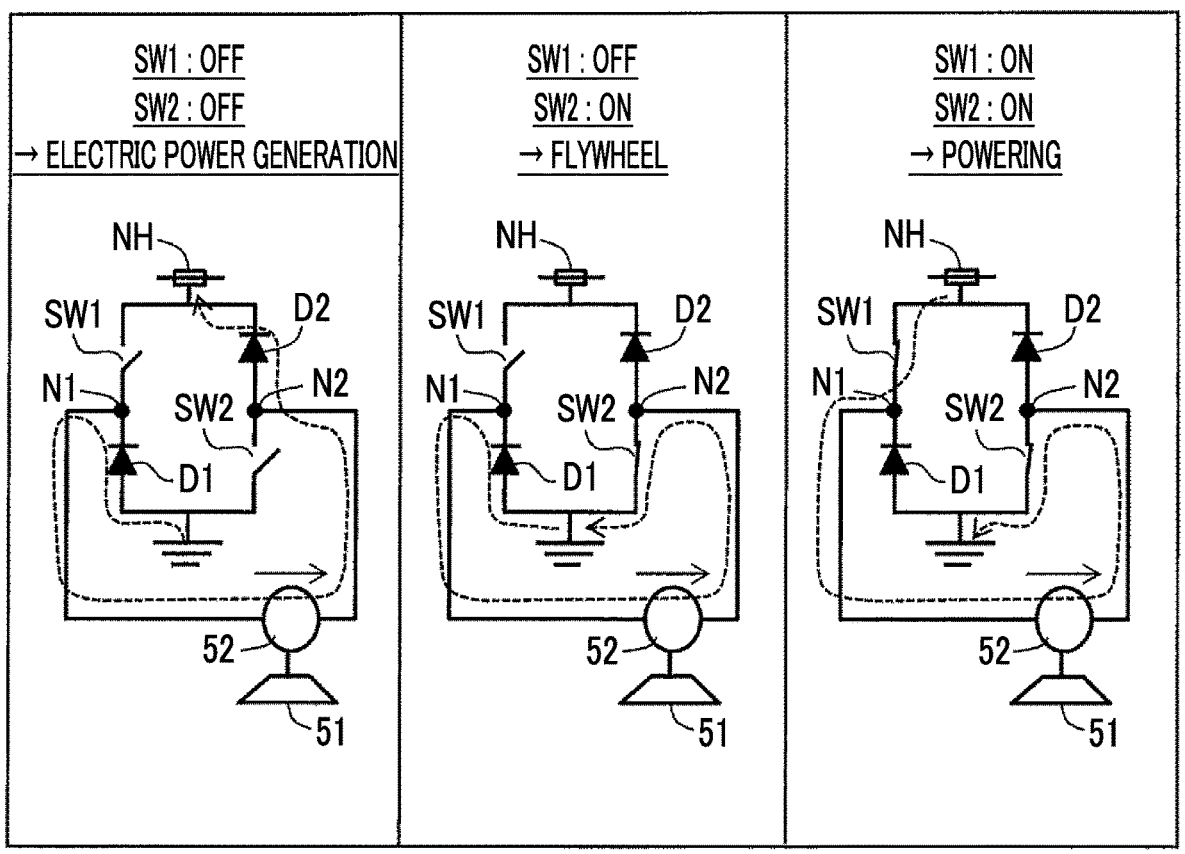
FIG. 2 is a diagram illustrating an example of a circuit configuration for electric power generation control and powering control in the exhaust turbine power generating system according to the embodiment of the present disclosure.

FIG. 2 is a diagram illustrating an example of a circuit configuration for electric power generation control and powering control in the exhaust turbine power generating system 1 according to the embodiment. The circuit configuration is included in, for example, the exhaust turbine power generator 50. Specifically, a node N1 is connected to a high potential side node NH via a first switch SW1 and the node N1 is connected to the ground via a diode D1. A node N2 is connected to a high potential side node NH via a diode D2 and the node N2 is connected to the ground via a second switch SW2. The generator 52 is connected between the node N1 and the node N2. On-off control of the first switch SW1 and the second switch SW2 is performed by the electronic control unit 100.

When the turbine 51 recovers the exhaust energy and the turbine 51 rotates, a rotor in the generator 52 rotates and an induced electromotive force is generated in a coil in the generator 52. The direction of the induced electromotive force in the generator 52 is represented by an arrow in FIG. 2. In the electric power generation control, the electronic control unit 100 turns the first switch SW1 and the second switch SW2 off. In this case, electricity is drawn toward the high potential side node NH and the exhaust turbine power generator 50 enters an "electric power generation state".

Meanwhile, in a case where the second switch SW2 is turned on with the first switch SW1 being turned off, a closed circuit (flywheel) as illustrated in FIG. 2 is formed, and thus the exhaust turbine power generator 50 enters a "non-electric power generation state". The electronic control unit 100 can also control an electric power generation capability by performing the on-off control of the second switch SW2 with the first switch SW1 being maintained in the turned-off state.

Meanwhile, in the powering control, the electronic control unit 100 turns the first switch SW1 and the second switch SW2 on. In this case, electric power is supplied to the generator 52 from the high potential side node NH and the exhaust turbine power generator 50 enters a "powering state". That is, the generator 52 functions as an electric motor and rotates the turbine 51. The electronic control unit 100 can also control a powering capability by performing the on-off control of the first switch SW1 with the second switch SW2 being maintained in the turned-on state. The electronic control unit 100 can increase the turbine rotation rate Nt by performing the above-described powering control.

2. Outline of Assist Control

The inventors of the present application have focused on the time at which the internal combustion engine 10 is started. In the following description, the start of the internal combustion engine 10 will be referred to as "the start of the engine". The meaning of the start of the engine includes a restart after the stop of the engine for idle reduction (stop-start), in addition to a cold start.

Generally, when the turbine rotation rate Nt is not equal to or greater than an electric power generation possible rotation rate, it is not possible to perform appropriate electric power generation in the exhaust turbine power generator 50. At a time immediately after the start of the engine, the turbine rotation rate Nt is low and waiting for the turbine rotation rate Nt to reach the electric power generation possible rotation rate is needed. In other words, at a time immediately after the start of the engine, it is not possible to start electric power generation at an early stage. This implies a decrease in electric power generation opportunity and electric power generation amount, which is not preferable.

In the embodiment, control with which it is possible to more rapidly increase the turbine rotation rate Nt after the start of the engine will be proposed. Hereinafter, control for more rapidly increasing the turbine rotation rate Nt will be referred to as "assist control". More specifically, in the assist control, the electronic control unit 100 performs the powering control (refer to FIG. 2) of the exhaust turbine power generator 50. Here, the expression "to perform powering control" means "to intermittently perform powering control" in addition to "to continuously perform powering control". That is, the meaning of the expression "to perform powering control" includes both of a case where the powering control is performed solely and a case where the powering control and the electric power generation control are alternately performed.

Figure 3:
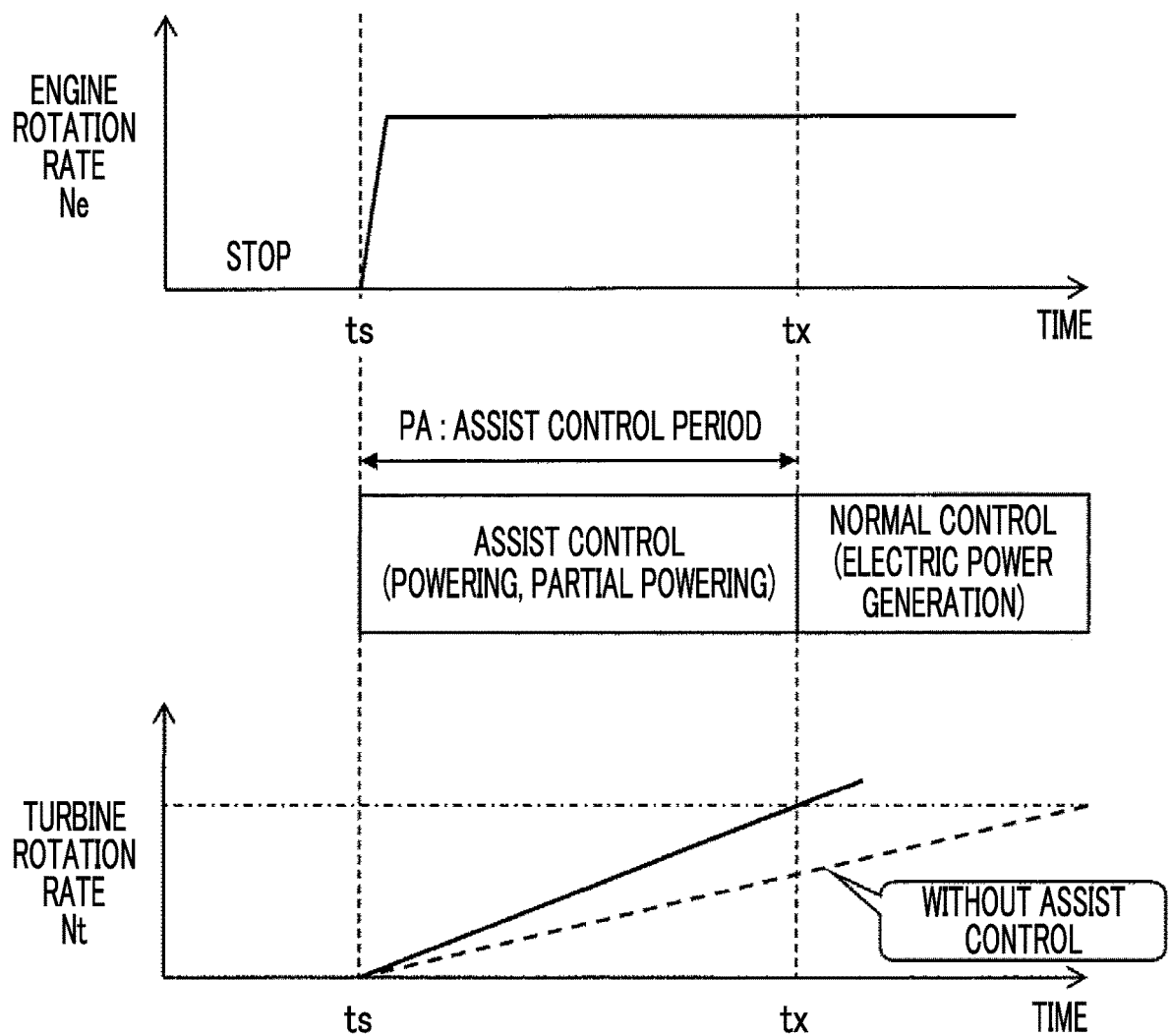
FIG. 3 is a timing chart for describing the outline of assist control in the exhaust turbine power generating system according to the embodiment of the present disclosure.

FIG. 3 is a timing chart for describing the outline of the assist control according to the embodiment. In FIG. 3, the horizontal axis represents time and the vertical axis represents the engine rotation rate Ne or the turbine rotation rate Nt. A start timing ts is a timing at which the internal combustion engine 10 is started. Before the start timing ts, the internal combustion engine 10 is in a stopped state and after the start timing ts, the internal combustion engine 10 is in an operated state.

In an example illustrated in FIG. 3, the electronic control unit 100 starts the assist control at the start timing ts. Alternatively, the electronic control unit 100 may detect an engine start signal and may start the assist control shortly before the start timing ts. In any case, the electronic control unit 100 performs the assist control at least after the start timing ts. As described above, in the assist control, at least the powering control of the exhaust turbine power generator 50 is performed. Therefore, in comparison with a case where the assist control is not performed, the turbine rotation rate Nt is increased more rapidly.

The assist control is performed until a predetermined termination condition is satisfied. In the example illustrated in FIG. 3, at time tx after the start timing ts, the predetermined termination condition is satisfied and the assist control is terminated. That is, the electronic control unit 100 performs the assist control (powering control and partial powering control) at least until the predetermined termination condition is satisfied after the engine is started. A time period for which the assist control is performed is an assist control period PA.

After the assist control period PA, the electronic control unit 100 performs the normal electric power generation control without performing the powering control. Accordingly, the turbine rotation rate Nt is restrained from exceeding an electric power generation upper limit rotation rate.

As described above, according to the embodiment, the electronic control unit 100 performs the assist control (powering control and partial powering control) at least until the predetermined termination condition is satisfied after the engine is started. Accordingly, in comparison with a case where the assist control is not performed, the turbine rotation rate Nt is increased more rapidly. That is, it is possible to more rapidly increase the turbine rotation rate Nt to the electric power generation possible rotation rate and it is possible to start electric power generation at an early stage. As a result, there is an increase in electric power generation opportunity and electric power generation amount after the start of the engine.

Particularly, in a hybrid vehicle, there is a possibility that an engine is stopped and restarted frequently. When the assist control according to the embodiment is performed for each time the engine, which is restarted relatively frequently, is restarted, an excellent electric power generation effect can be obtained and the fuel efficiency is also improved.

3. Specific Example of Assist Control

Hereinafter, a specific example of the assist control in the exhaust turbine power generating system 1 according to the embodiment will be described.

3-1. Assist Control Including Switch Control

Figure 4:
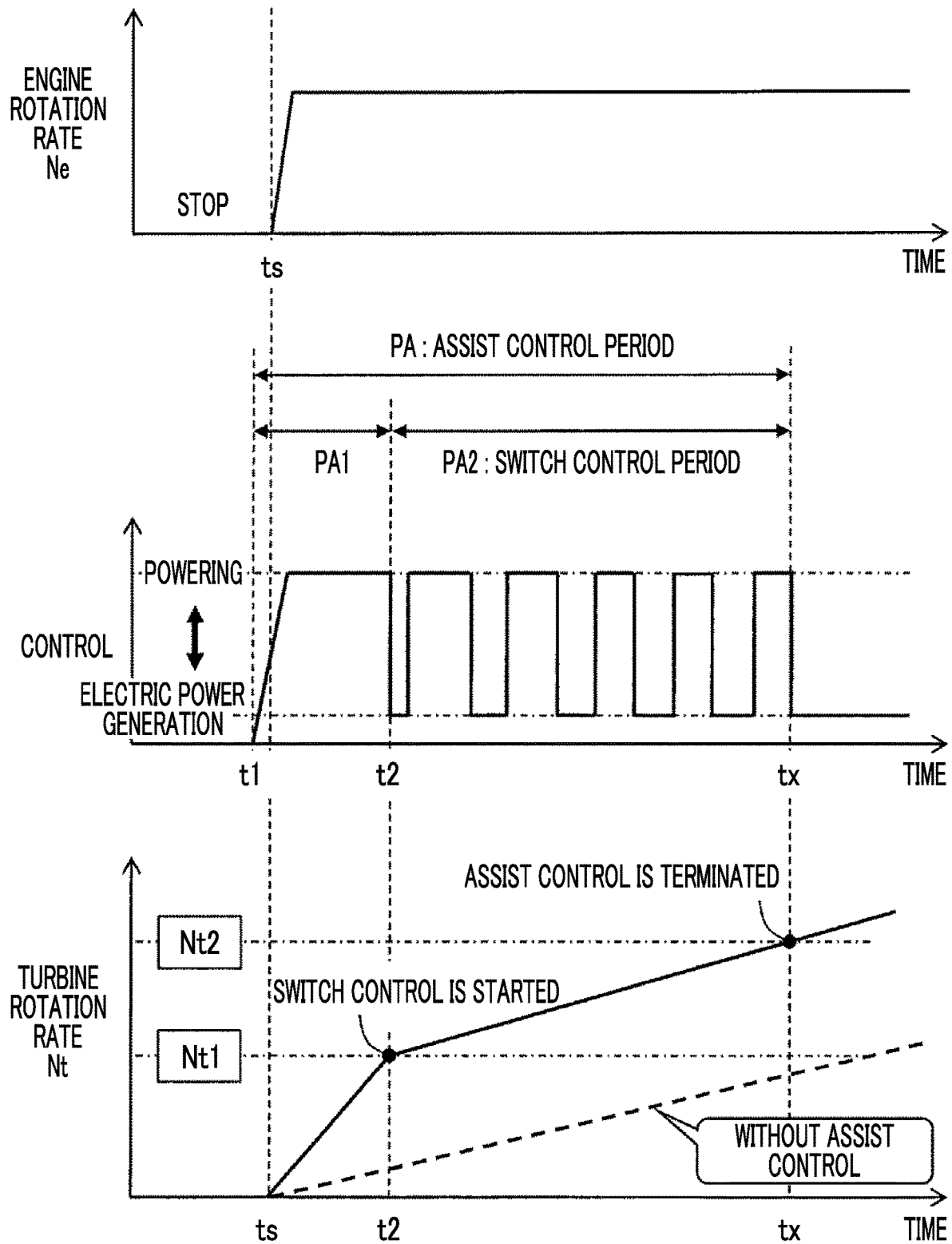
FIG. 4 is a timing chart illustrating an example of the assist control in the exhaust turbine power generating system according to the embodiment of the present disclosure.

FIG. 4 is a timing chart illustrating an example of the assist control according to the embodiment. In FIG. 4, the horizontal axis represents time and the vertical axis represents the engine rotation rate Ne, the contents of control, or the turbine rotation rate Nt.

As illustrated in FIG. 4, the assist control period PA for which the assist control is performed is divided into two periods PA1, PA2. In a first period PA1, the electronic control unit 100 performs the powering control without performing the electric power generation control. Meanwhile, in the second period PA2, the electronic control unit 100 alternately performs the electric power generation control and the powering control. Hereinafter, control in which the electric power generation control and the powering control are alternately performed as described above will be referred to as "switch control". Hereinafter, the second period PA2 for which the switch control is performed will be referred to as a "switch control period PA2". Hereinafter, a condition for starting the switch control will be referred to as a "switch start condition". For example, the switch start condition is a condition that the turbine rotation rate Nt reaches a switch start rotation rate Nt1.

In an example illustrated in FIG. 4, the electronic control unit 100 starts the powering control (assist control) at time t1. Time t1 may be the same time as the start timing ts and time t1 may be slightly earlier than the start timing ts. After time t1, the turbine rotation rate Nt is increased. Then, at time t2, the turbine rotation rate Nt reaches the switch start rotation rate Nt1. That is, the switch start condition is satisfied. Therefore, a period between time t1 and time t2 is the first period PA1. In the first period PA1, the electronic control unit 100 performs the powering control without performing the electric power generation control. Accordingly, it is possible to effectively increase the turbine rotation rate Nt.

When the switch start condition is satisfied at time t2, the electronic control unit 100 starts the switch control and the switch control period PA2 is started. In the switch control, the electronic control unit 100 alternately performs the electric power generation control and the powering control. Accordingly, it is possible to perform electric power generation while increasing the turbine rotation rate Nt. That is, electric power generation opportunity and electric power generation amount are further increased.

The switch control is performed until the predetermined termination condition is satisfied. For example, the termination condition is that the turbine rotation rate Nt reaches a powering termination rotation rate Nt2. The powering termination rotation rate Nt2 is greater than the switch start rotation rate Nt1 (Nt2>Nt1). In the example illustrated in FIG. 4, at time tx, the turbine rotation rate Nt reaches the powering termination rotation rate Nt2. That is, the termination condition is satisfied. A period between time t2 and time tx is the switch control period PA2.

When the termination condition is satisfied at time tx, the electronic control unit 100 terminates the switch control (assist control). Thereafter, the electronic control unit 100 performs the normal electric power generation control without performing the powering control. Accordingly, the turbine rotation rate Nt is restrained from exceeding the electric power generation upper limit rotation rate.

3-2. Details of Switch Control

As described above, in the switch control, both of the electric power generation control and the powering control are performed. In this case, in the viewpoint of improving the electric power generation efficiency, it is desirable that the electric power generation control is performed during a period in which the exhaust energy from the internal combustion engine 10 is as high as possible. In the embodiment, switching between the electric power generation control and the powering control is performed in consideration of a variation in exhaust energy from the internal combustion engine 10. First, a variation in exhaust energy from the internal combustion engine 10 will be described.

Figure 5:
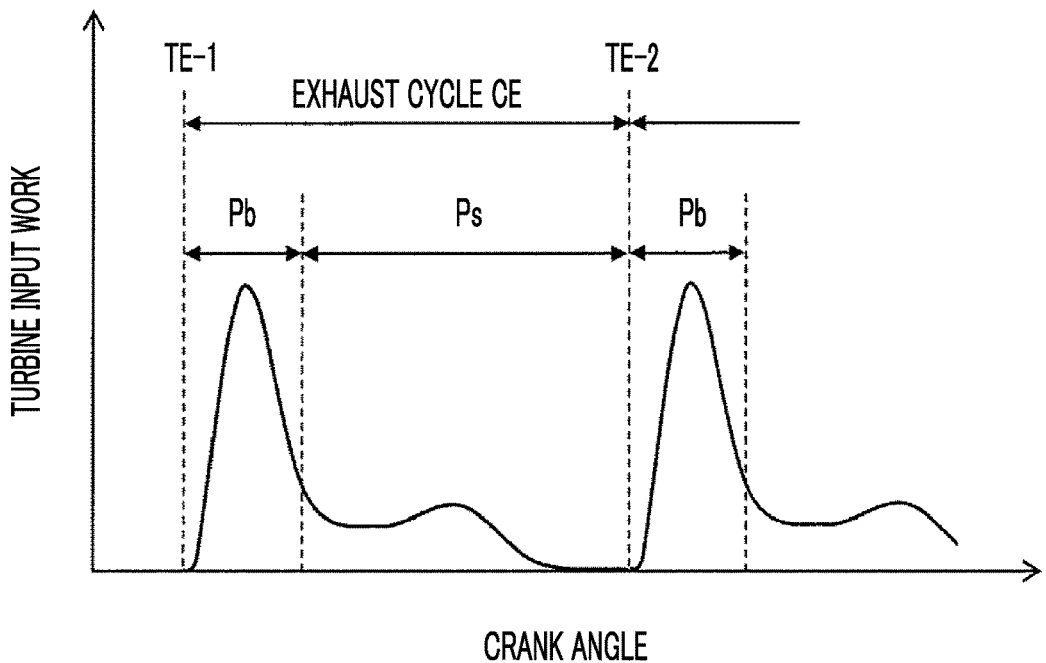
FIG. 5 is a timing chart for describing an exhaust cycle in the exhaust turbine power generating system according to the embodiment of the present disclosure.

FIG. 5 is a timing chart for describing an exhaust cycle CE in the embodiment. The horizontal axis represents the crank angle and the vertical axis represents the turbine input work. The turbine input work corresponds to exhaust energy input to the turbine 51 from the internal combustion engine 10.

When the exhaust valve is opened in an arbitrary cylinder 11 of the internal combustion engine 10, exhaust gas is discharged to the exhaust pipe 30 from the cylinder 11 and is input to the turbine 51. Hereinafter, a timing at which discharge of exhaust gas toward the turbine 51 from the cylinder 11 is started will be referred to as an "exhaust start timing TE". The exhaust start timing TE corresponds to the timing of opening of the exhaust valve.

The exhaust start timing TE comes periodically. For example, in the configuration illustrated in FIG. 1, the respective exhaust valves of the three cylinders 11-1, 11-2, 11-3 are opened subsequently. In FIG. 5, two temporally consecutive exhaust start timings TE are represented by "TE-1" and "TE-2". A period between the two consecutive exhaust start timings TE-1, TE-2 is the "exhaust cycle CE" in the embodiment. The length of the exhaust cycle CE is inversely proportional to the engine rotation rate Ne. That is, the engine rotation rate Ne decreases, the exhaust cycle CE is lengthened.

As illustrated in FIG. 5, the turbine input work (exhaust energy) in one exhaust cycle CE is not constant. The turbine input work is relatively high at an initial stage of the exhaust cycle CE and becomes small with time.

More specifically, before the exhaust valve is opened, in a combustion and expansion stroke in the internal combustion engine 10, the temperature and the pressure in the cylinders 11 are increased. Therefore, a high-temperature and high-pressure exhaust gas is discharged at a high speed that is close to the speed of sound immediately after the exhaust valve is opened. An exhaust stream that is discharged at an initial stage of an exhaust stroke as described above is called a "blowdown stream". In the initial stage of the exhaust stroke, the turbine input work becomes relatively large due to the blowdown stream.

The pressure in the cylinders 11 is decreased to a pressure close to the atmospheric pressure after the blowdown stream. Remaining gas in the cylinders 11 is pushed out toward the exhaust pipe 30 due to rising of the piston. An exhaust gas stream pushed out by the piston as described above will be referred to as a "scavenging stream". The energy of the scavenging stream is smaller than the energy of the blowdown stream. That is, the turbine input work in a late stage of the exhaust stroke is relatively smaller than the turbine input work in the initial stage of the exhaust stroke.

As illustrated in FIG. 5, the exhaust cycle CE is divided into a plurality of periods according to the size of turbine input work. More specifically, a blowdown period Pb is a period during the initial stage of the exhaust stroke in which the turbine input work becomes relatively large due to the blowdown stream. The blowdown period Pb starts at the exhaust start timing TE that is the timing of the start of the exhaust cycle CE and continues for a while. A scavenging period Ps is a period after the blowdown period Pb and is a period in which the turbine input work becomes relatively small. The total amount of turbine input work in the scavenging period Ps is smaller than the total amount of turbine input work in the blowdown period Pb.

As described above, the turbine input work varies in one exhaust cycle CE. When the switch control is performed, it is preferable that the blowdown period Pb, in which the turbine input work becomes relatively large, is allocated mainly for the "electric power generation control" in the viewpoint of the electric power generation efficiency. Meanwhile, it is preferable that the scavenging period Ps, in which the turbine input work becomes relatively small, is allocated mainly for the "powering control" for increasing the turbine rotation rate Nt. Accordingly, it is possible to efficiently realize both of an increase in electric power generation amount and an increase in turbine rotation rate Nt at an early stage.

Figure 6:
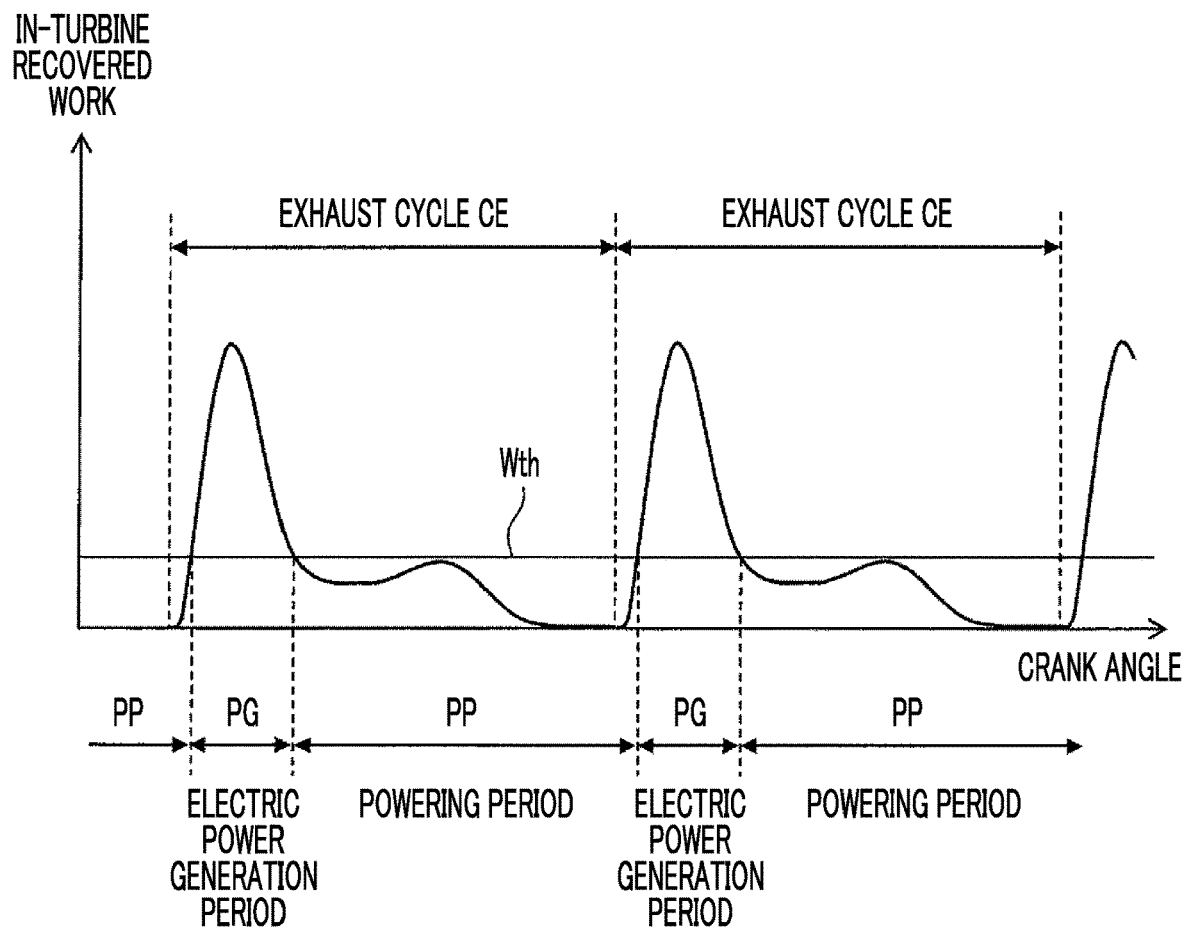
FIG. 6 is a timing chart for describing an example of switch control in the exhaust turbine power generating system according to the embodiment of the present disclosure.

FIG. 6 is a timing chart for describing an example of the switch control according to the embodiment. The horizontal axis represents the crank angle and the vertical axis represents the in-turbine recovered work. The in-turbine recovered work is given as a product of the turbine input work and the turbine efficiency. The in-turbine recovered work varies in one exhaust cycle CE as with the turbine input work.

In an example illustrated in FIG. 6, a "switch threshold value Wth" is used to switch between the electric power generation control and the powering control. Specifically, in a case where the in-turbine recovered work is equal to or greater than the switch threshold value Wth, the electronic control unit 100 performs the electric power generation control. Meanwhile, in a case where the in-turbine recovered work is smaller than the switch threshold value Wth, the electronic control unit 100 performs the powering control. In one exhaust cycle CE, a period for which the electric power generation control is performed is an electric power generation period PG and a period for which the powering control is performed is a powering period PP. The electric power generation period PG does not necessarily completely coincide with the blowdown period Pb. However, the electric power generation period PG includes at least a portion of the blowdown period Pb. Since the electric power generation control is performed at the electric power generation period PG in which the in-turbine recovered work is relatively large, it is possible to improve the electric power generation efficiency.

Since the switch threshold value Wth is used as described above, it is possible to appropriately switch between the electric power generation control and the powering control in one exhaust cycle CE. The timing to switch between the electric power generation control and the powering control may be changeable as described below.

Figure 7:
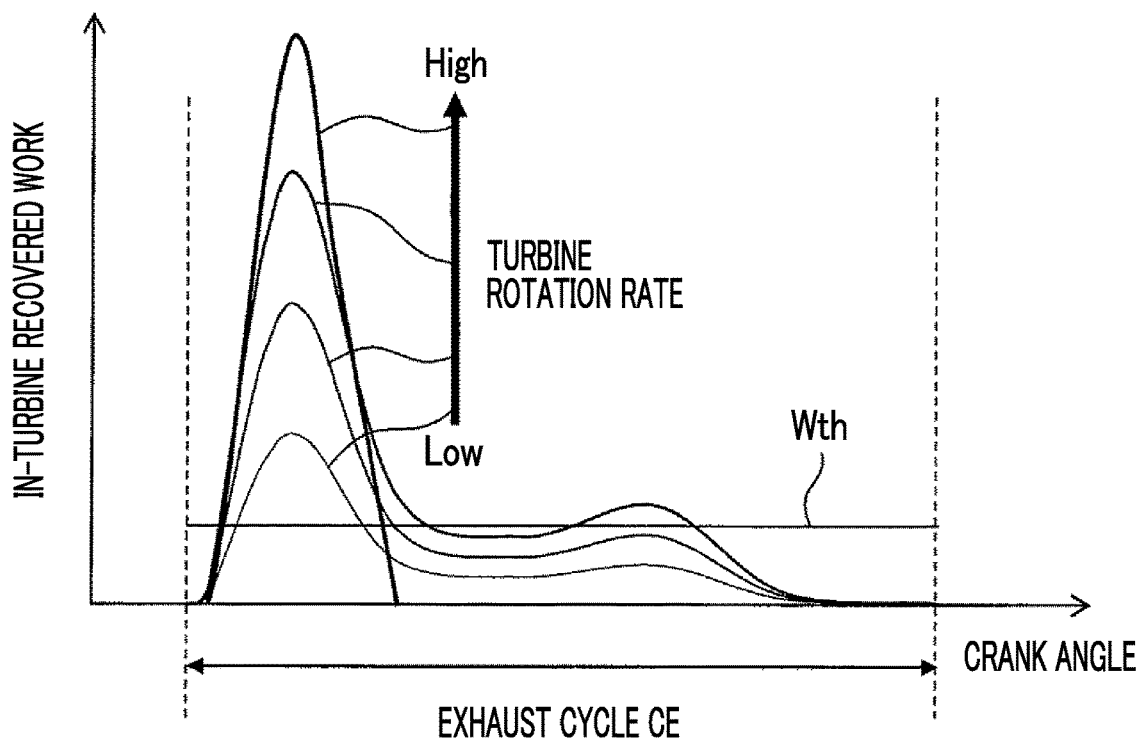
FIG. 7 is a conceptual diagram for describing a relationship between in-turbine recovered work and a turbine rotation rate in the exhaust turbine power generating system according to the embodiment of the present disclosure.

FIG. 7 illustrates a relationship between the in-turbine recovered work and the turbine rotation rate Nt. The horizontal axis represents the crank angle and the vertical axis represents the in-turbine recovered work. As illustrated in FIG. 7, the maximum value or the variation pattern of the in-turbine recovered work in one exhaust cycle CE changes according to the turbine rotation rate Nt. This is because the turbine efficiency depends on the turbine rotation rate Nt. The electric power generation period PG in which the in-turbine recovered work becomes equal to or greater than the switch threshold value Wth changes according to the turbine rotation rate Nt. There may be a case where a plurality of electric power generation periods PG is present within one exhaust cycle CE although depending on the switch threshold value Wth.

Figure 8:
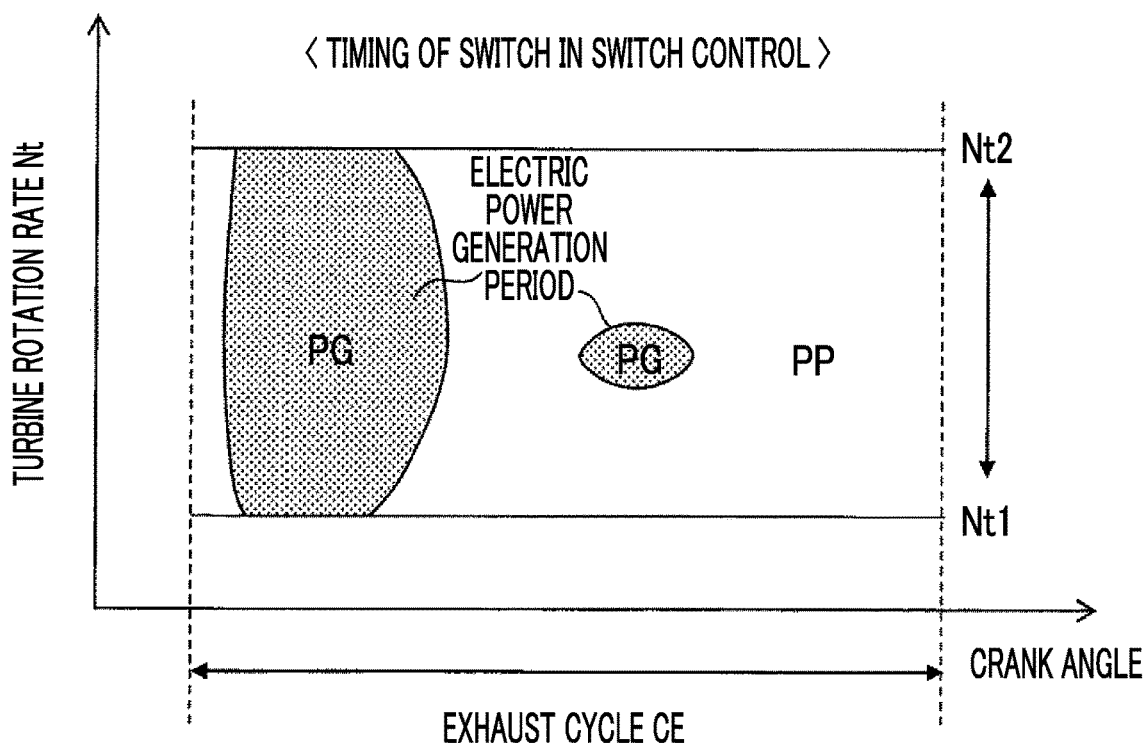
FIG. 8 is a conceptual diagram illustrating the timing to switch between the electric power generation control and the powering control in the exhaust turbine power generating system according to the embodiment of the present disclosure.

FIG. 8 is a conceptual diagram illustrating the timing to switch between the electric power generation control and the powering control in the switch control according to the embodiment. The horizontal axis represents the crank angle and the vertical axis represents the turbine rotation rate Nt. As illustrated in FIG. 8, the timing to switch between the electric power generation control and the powering control changes according to the turbine rotation rate Nt.

For example, a situation in which the turbine rotation rate Nt increases from the switch start rotation rate Nt1 (refer to FIG. 4) will be discussed. In this case, the timing to switch from the electric power generation control (electric power generation period PG) to the powering control (powering period PP) is gradually delayed and then becomes faster again thereafter. Meanwhile, the timing to switch from the powering control (powering period PP) to the electric power generation control (electric power generation period PG) gradually becomes earlier and is then delayed again thereafter. Instead of the turbine rotation rate Nt, the engine rotation rate Ne and the amount of air Ga may be used.

As described above, the electronic control unit 100 may change the timing to switch between the electric power generation control and the powering control in the switch control according to the turbine rotation rate Nt. Accordingly, the switch control becomes more accurate, and thus it is possible to further improve the electric power generation efficiency.

3-3. Functional Block and Flowchart

Figure 9:
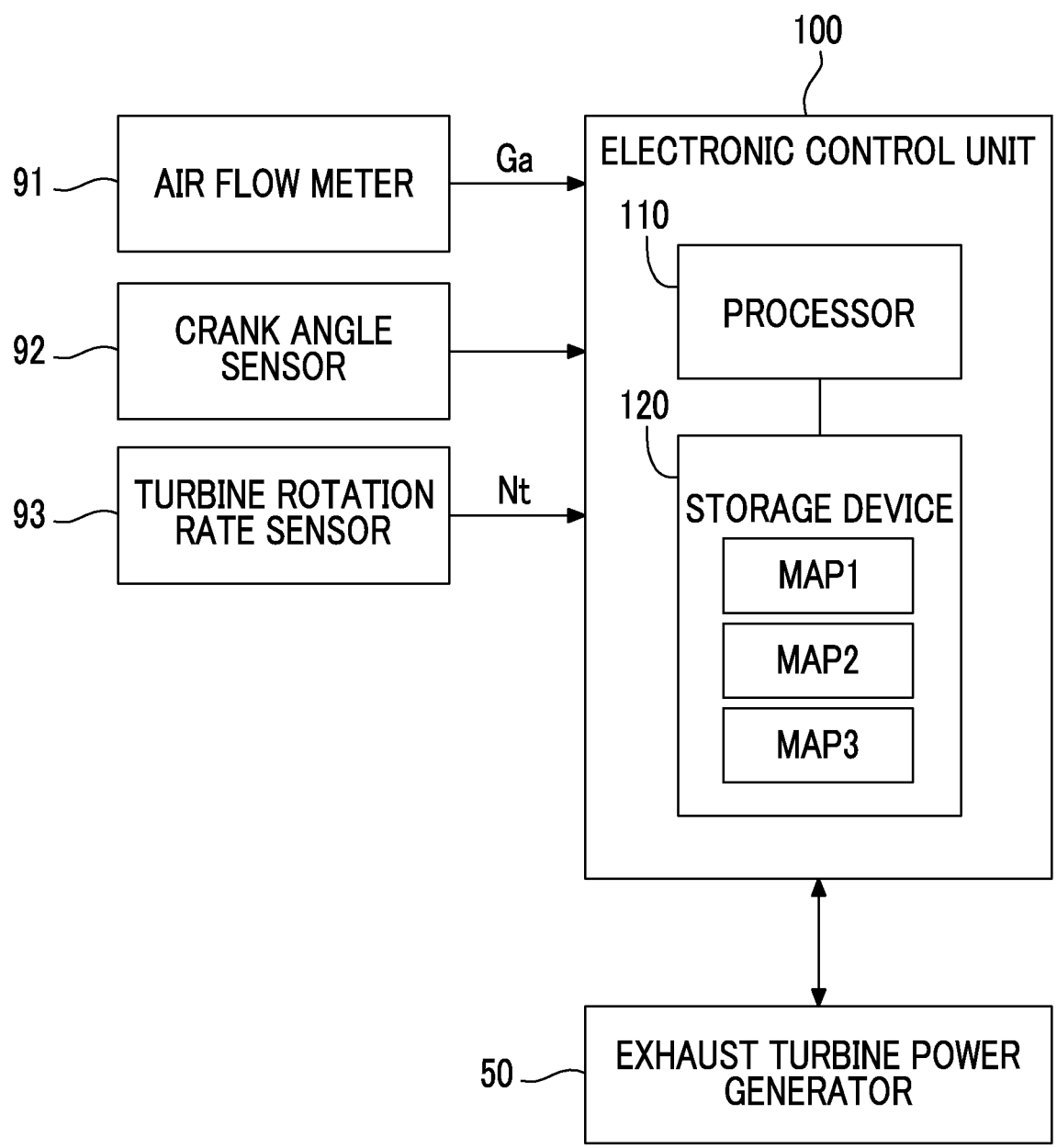
FIG. 9 is a block diagram illustrating a functional block related to the assist control in the exhaust turbine power generating system according to the embodiment of the present disclosure.

FIG. 9 is a block diagram illustrating a functional block related to the assist control in the exhaust turbine power generating system 1 according to the embodiment.

The air flow meter 91 detects the amount of air Ga supplied to the internal combustion engine 10 and transmits detection information to the electronic control unit 100. The crank angle sensor 92 detects a crank angle and transmits detection information to the electronic control unit 100. The electronic control unit 100 calculates the engine rotation rate Ne based on the detection information from the crank angle sensor 92. The turbine rotation rate sensor 93 detects the turbine rotation rate Nt and transmits detection information to the electronic control unit 100.

The electronic control unit 100 performs the assist control in the exhaust turbine power generator 50 based on the crank angle, the turbine rotation rate Nt, the engine rotation rate Ne, the amount of air Ga, and the like. More specifically, the electronic control unit 100 is provided with a processor 110 and a storage device 120. When the processor 110 executes a control program stored in the storage device 120, the assist control according to the embodiment is realized.

The storage device 120 may store a switch start rotation rate map MAP1, a powering termination rotation rate map MAP2, and a switch timing map MAP3.

Figure 10:
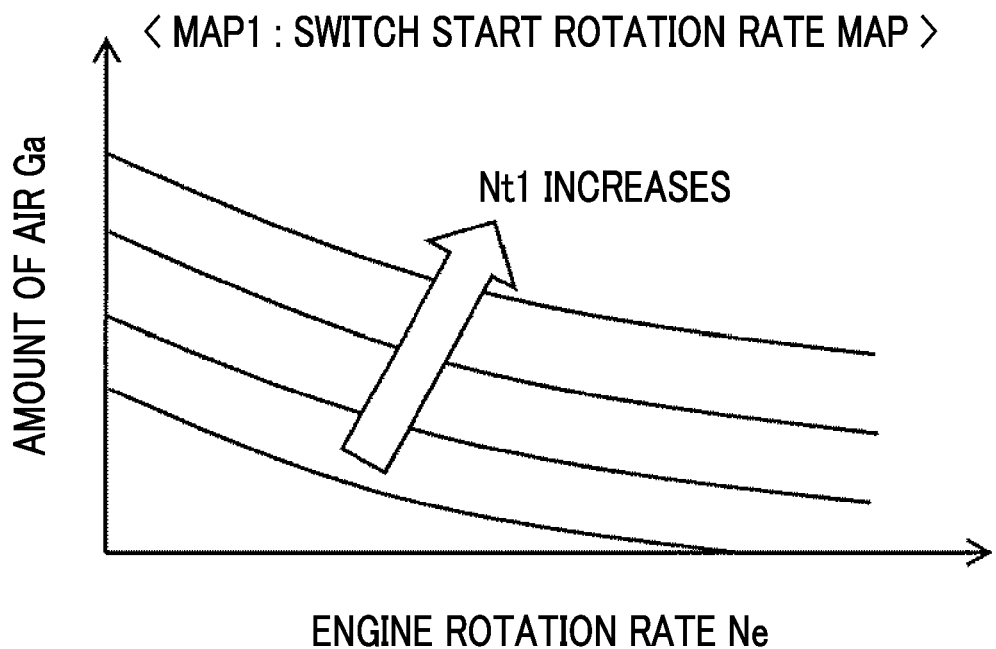
FIG. 10 is a conceptual diagram for describing a switch start rotation rate map in the exhaust turbine power generating system according to the embodiment of the present disclosure.

FIG. 10 is a conceptual diagram for describing the switch start rotation rate map MAP1. The switch start rotation rate map MAP1 is used to calculate the switch start rotation rate Nt1 (refer to FIG. 4). For example, the switch start rotation rate Nt1 is given as a function of the amount of air Ga and the engine rotation rate Ne. The larger the amount of air Ga and the higher the engine rotation rate Ne, the higher the switch start rotation rate Nt1. The switch start rotation rate map MAP1 is a map representing a correspondence relationship between the above-described input parameters (Ga and Ne) and the switch start rotation rate Nt1. The switch start rotation rate map MAP1 is created in advance and is stored in the storage device 120. The electronic control unit 100 can calculate the switch start rotation rate Nt1 according to the input parameters (Ga and Ne) by referring to the switch start rotation rate map MAP1 stored in the storage device 120.

Figure 11:
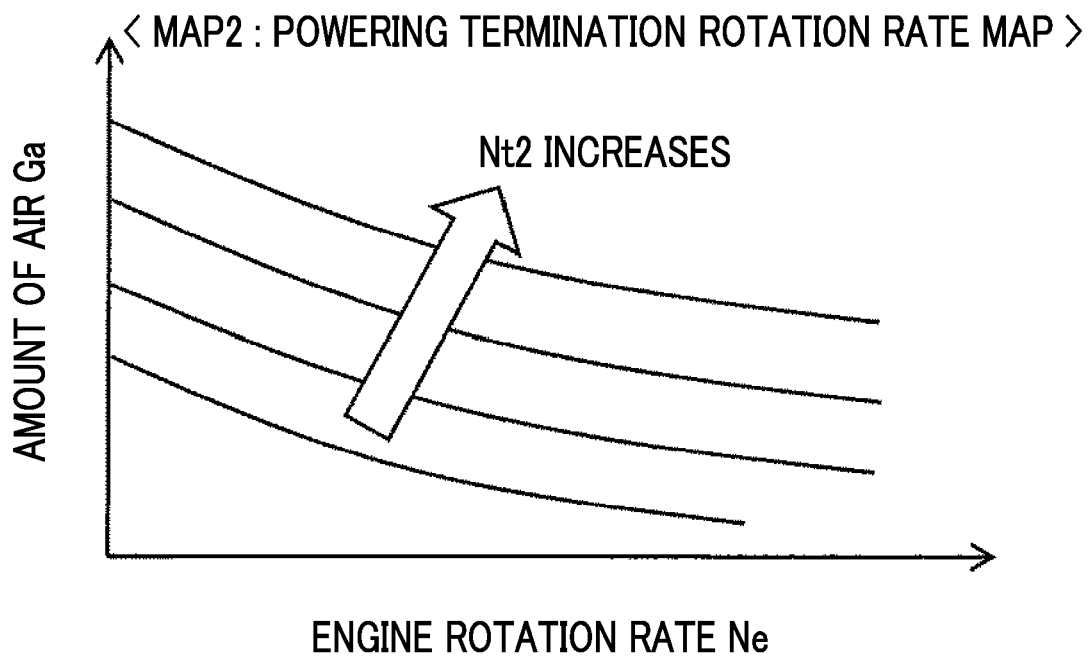
FIG. 11 is a conceptual diagram for describing a powering termination rotation rate map in the exhaust turbine power generating system according to the embodiment of the present disclosure.

FIG. 11 is a conceptual diagram for describing the powering termination rotation rate map MAP2. The powering termination rotation rate map MAP2 is used to calculate the powering termination rotation rate Nt2 (refer to FIG. 4). For example, the powering termination rotation rate Nt2 is given as a function of the amount of air Ga and the engine rotation rate Ne. The larger the amount of air Ga and the higher the engine rotation rate Ne, the higher the powering termination rotation rate Nt2. The powering termination rotation rate map MAP2 is a map representing a correspondence relationship between the above-described input parameters (Ga and Ne) and the powering termination rotation rate Nt2. The powering termination rotation rate map MAP2 is created in advance and is stored in the storage device 120. The electronic control unit 100 can calculate the powering termination rotation rate Nt2 according to the input parameters (Ga and Ne) by referring to the powering termination rotation rate map MAP2 stored in the storage device 120.

The switch timing map MAP3 is used to acquire the timing to switch between the electric power generation control and the powering control in the switch control. More specifically, the switch timing map MAP3 represents a correspondence relationship between the timing of switch as illustrated in FIG. 8 and the turbine rotation rate Nt. The switch timing map MAP3 is created in advance and is stored in the storage device 120. The electronic control unit 100 can acquire the timing of switch according to the turbine rotation rate Nt by referring to the switch timing map MAP3 stored in the storage device 120.

Figure 12:
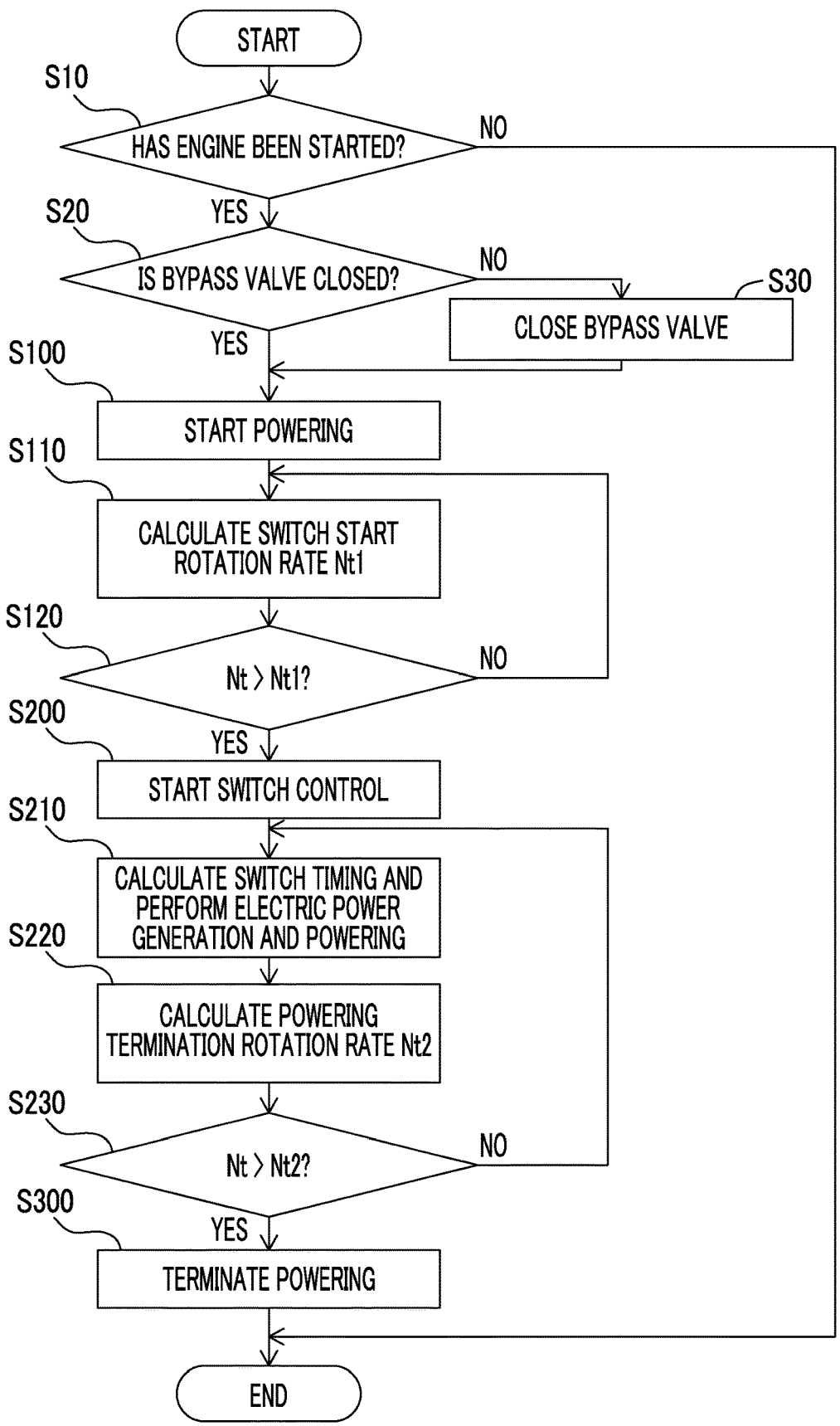
FIG. 12 is a flowchart illustrating the assist control in the exhaust turbine power generating system according to the embodiment of the present disclosure.

FIG. 12 is a flowchart illustrating the assist control in the exhaust turbine power generating system 1 according to the embodiment. A processing flow illustrated in FIG. 12 is repeated for each predetermined cycle.

Step S10: The electronic control unit 100 detects the start of the engine. For example, the electronic control unit 100 detects the engine start signal for instructing the start of the engine. Since the engine start signal is detected, it is possible to detect the start of the engine before the start timing is (refer to FIGS. 3 and 4) at which the internal combustion engine 10 is actually started. In a case where the start of the engine is not detected (No in step S10), the process of a current cycle is terminated. When the start of the engine is detected (Yes in step S10), the process proceeds to step S20.

Step S20: The electronic control unit 100 determines whether the bypass valve 45 is closed or not. In a case where the bypass valve 45 is not closed (No in step S20), the process proceeds to step S30. Meanwhile, in a case where the bypass valve 45 is closed (Yes in step S20), the process proceeds to step S100.

Step S30: The electronic control unit 100 closes the bypass valve 45. Thereafter, the process proceeds to step S100.

Step S100: The electronic control unit 100 starts the assist control. More specifically, the first period PA1 (refer to FIG. 4) of the assist control period PA is started and the electronic control unit 100 starts the powering control. Thereafter, the process proceeds to step S110.

Step S110: The electronic control unit 100 calculates the switch start rotation rate Nt1 (refer to FIG. 4). Specifically, the electronic control unit 100 calculates the switch start rotation rate Nt1 according to the input parameters (Ga and Ne) by using the switch start rotation rate map MAP1 (refer to FIG. 10). Thereafter, the process proceeds to step S120.

Step S120: The electronic control unit 100 determines whether the turbine rotation rate Nt exceeds the switch start rotation rate Nt1. In a case where the turbine rotation rate Nt does not exceed the switch start rotation rate Nt1 (No in step S120), the process returns to step S110. Meanwhile, in a case where the turbine rotation rate Nt exceeds the switch start rotation rate Nt1 (Yes in step S120), the process proceeds to step S200.

Step S200: The electronic control unit 100 starts the switch control. That is, the switch control period PA2 (refer to FIG. 4) of the assist control period PA is started. Thereafter, the process proceeds to step S210.

Step S210: The electronic control unit 100 calculates the timing to switch between the electric power generation control and the powering control in the current exhaust cycle CE. Specifically, the electronic control unit 100 calculates the timing of switch according to the current turbine rotation rate Nt by using the switch timing map MAP3 (refer to FIG. 8). In addition, the electronic control unit 100 performs the switch control, that is, the electric power generation control and the powering control in accordance with the calculated timing of switch. Thereafter, the process proceeds to step S220.

Step S220: The electronic control unit 100 calculates the powering termination rotation rate Nt2 (refer to FIG. 4). Specifically, the electronic control unit 100 calculates the powering termination rotation rate Nt2 according to the input parameters (Ga and Ne) by using the powering termination rotation rate map MAP2 (refer to FIG. 11). Thereafter, the process proceeds to step S230.

Step S230: The electronic control unit 100 determines whether the turbine rotation rate Nt exceeds the powering termination rotation rate Nt2. In a case where the turbine rotation rate Nt does not exceed the powering termination rotation rate Nt2 (No in step S230), the process returns to step S210. Meanwhile, in a case where the turbine rotation rate Nt exceeds the powering termination rotation rate Nt2 (Yes in step S230), the process proceeds to step S300.

Step S300: The electronic control unit 100 terminates the assist control. That is, the electronic control unit 100 terminates the powering control and performs the normal electric power generation control solely.

3-4. Effect

As described above, according to the embodiment, the electronic control unit 100 performs the assist control (powering control and partial powering control) at least until the termination condition is satisfied after the engine is started. Accordingly, in comparison with a case where the assist control is not performed, the turbine rotation rate Nt is increased more rapidly. That is, it is possible to more rapidly increase the turbine rotation rate Nt to the electric power generation possible rotation rate and it is possible to start electric power generation at an early stage. As a result, there is an increase in electric power generation opportunity and electric power generation amount after the start of the engine.

In the first period PA1, which is the first half of the assist control period PA, the electronic control unit 100 performs the powering control solely. Accordingly, it is possible to effectively increase the turbine rotation rate Nt. In addition, in the switch control period PA2, which is the second half of the assist control period PA, the electronic control unit 100 performs the switch control in which the electric power generation control and the powering control are alternately performed. Accordingly, it is possible to perform electric power generation while increasing the turbine rotation rate Nt. That is, electric power generation opportunity and electric power generation amount are further increased.

The electronic control unit 100 efficiently performs the switch control in consideration of a variation in turbine input work during the exhaust cycle CE. Specifically, the electronic control unit 100 performs the electric power generation control in at least a portion of the blowdown period Pb at which the blowdown stream is generated. Since the high-energy blowdown stream is effectively used, the electric power generation efficiency is improved and there is an increase in electric power generation amount. That is, it is possible to efficiently realize both of an increase in electric power generation amount and an increase in turbine rotation rate Nt at an early stage in the switch control in which the electric power generation control and the powering control are alternately performed.

The electronic control unit 100 may change the timing to switch between the electric power generation control and the powering control in the switch control according to the turbine rotation rate Nt. Accordingly, the switch control becomes more accurate, and thus it is possible to further improve the electric power generation efficiency.

The assist control according to the embodiment is particularly useful for a hybrid vehicle. In a hybrid vehicle, there is a possibility that an engine is stopped and restarted frequently. When the assist control according to the embodiment is performed for each time the engine, which is restarted relatively frequently, is restarted, an excellent electric power generation effect can be obtained and the fuel efficiency is also improved.

4. Modification Example of Exhaust Turbine Power Generating System

4-1. First Modification Example

Figure 13:
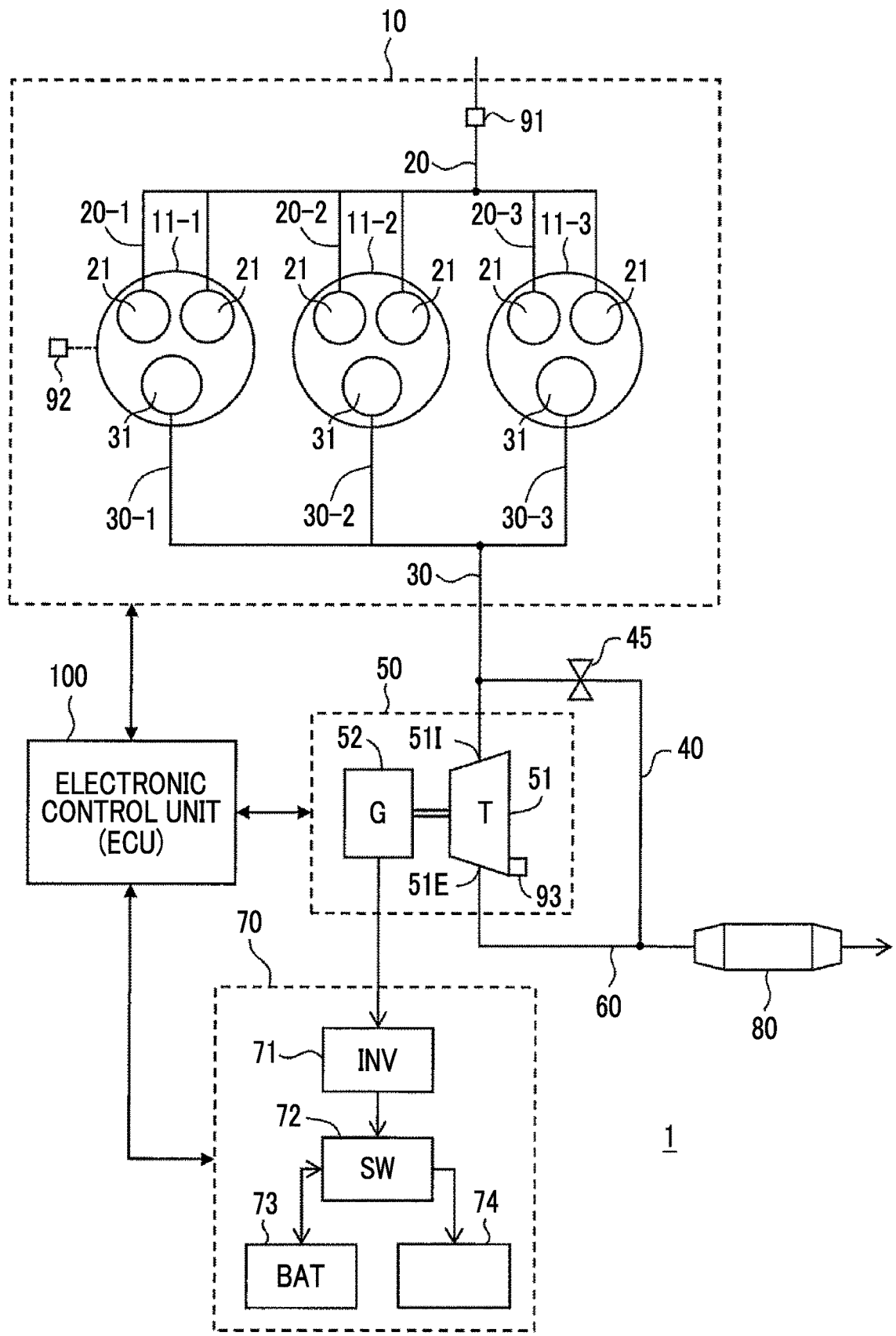
FIG. 13 is a schematic diagram illustrating a first modification example of the exhaust turbine power generating system according to the embodiment of the present disclosure.

FIG. 13 is a schematic diagram illustrating a first modification example of the exhaust turbine power generating system 1 according to the embodiment. The same description as in the case of the configuration illustrated in FIG. 1 will be appropriately omitted. In the configuration illustrated in FIG. 1, each cylinder 11-$i$ (i=1 to 3) is provided with two exhaust opening portions 31 (exhaust valve). However, in the first modification example, each cylinder 11-$i$ (i=1 to 3) is provided with one exhaust opening portion 31. The assist control according to the embodiment can be applied in the same manner to the configuration in the first modification example as described above.

4-2. Second Modification Example

Figure 14:
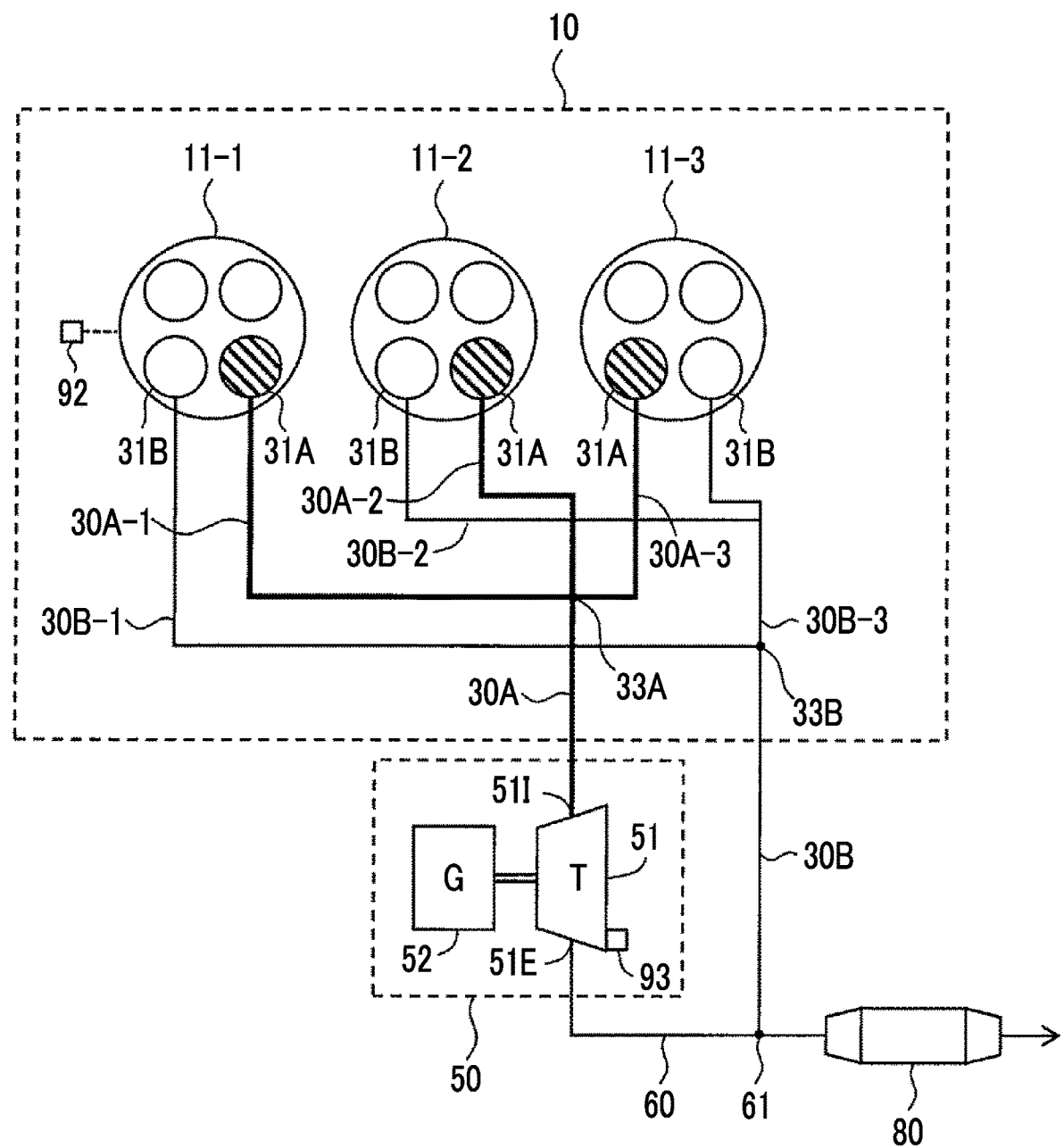
FIG. 14 is a schematic diagram illustrating a second modification example of the exhaust turbine power generating system according to the embodiment of the present disclosure.

FIG. 14 is a schematic diagram illustrating a second modification example of the exhaust turbine power generating system 1 according to the embodiment. In FIG. 14, the electric device 70 and the electronic control unit 100 are omitted.

In the second modification example, the exhaust path is divided into two systems. That is, the exhaust pipe 30 is divided into a first exhaust pipe 30A (main exhaust pipe) and a second exhaust pipe 30B (sub-exhaust pipe). More specifically, each cylinder 11-$i$ (i=1 to 3) includes a first exhaust opening portion 31A and a second exhaust opening portion 31B. First exhaust pipes 30A-i are connected to the cylinders 11-$i$ via the first exhaust opening portions 31A. Meanwhile, second exhaust pipes 30B-i are connected to the cylinders 11-$i$ via the second exhaust opening portions 31B.

The first exhaust pipes 30A-i are used to guide exhaust gas to the turbine 51 of the exhaust turbine power generator 50. Therefore, the first exhaust pipes 30A-i are disposed such that the first exhaust opening portions 31A and the turbine inlet portion 511 are connected to each other. More specifically, the first exhaust pipes 30A-i that respectively extend from the cylinders 11-$i$ are connected to the turbine inlet portion 511 after joining each other at a junction 33A.

Meanwhile, the second exhaust pipes 30B-i are used to discharge exhaust gas in such a manner that the exhaust gas is discharged without passing through the turbine 51. Therefore, the second exhaust pipes 30B-i are disposed such that second exhaust opening portions 31B-i and the turbine downstream side exhaust pipe 60 are connected to each other not via the turbine 51. That is, the second exhaust pipes 30B-i constitute a bypass exhaust path that does not pass through the turbine 51. As illustrated in FIG. 14, the second exhaust pipes 30B-i that respectively extend from the cylinders 11-$i$ are connected to a bypass connection point 61 on the turbine downstream side exhaust pipe 60 after joining each other at a junction 33B. The bypass connection point 61 is positioned downstream of the turbine 51 and is positioned upstream of the catalyst 80.

Figure 15:
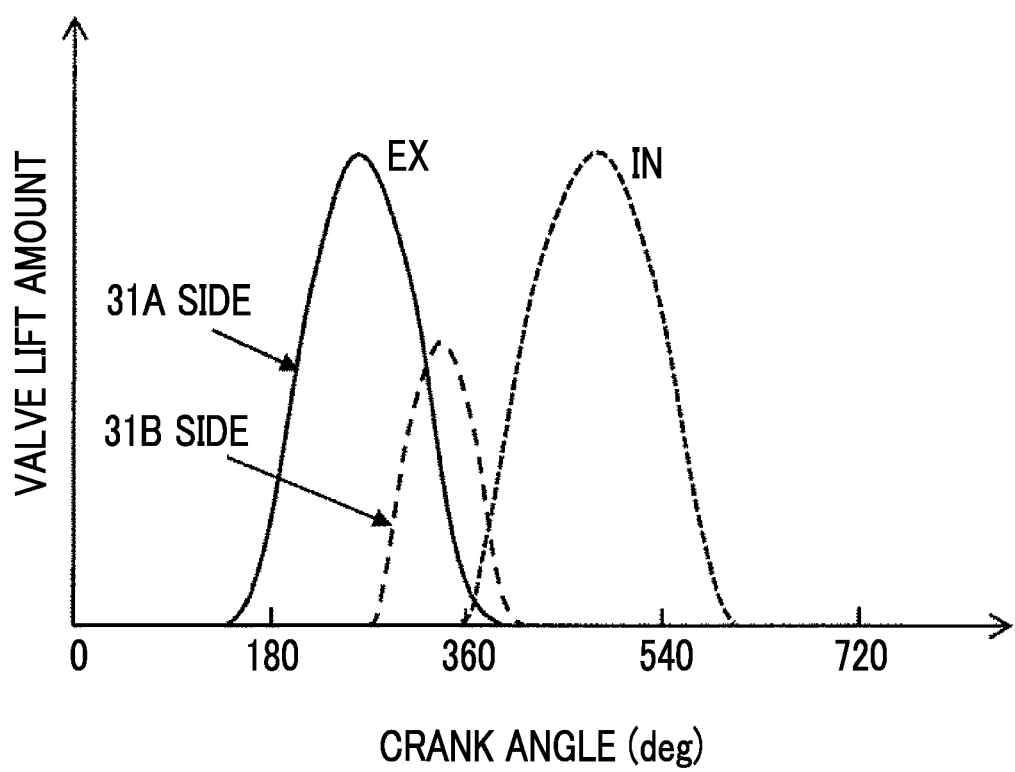
FIG. 15 is a graph illustrating valve control in the second modification example.

FIG. 15 is a graph illustrating valve control in the second modification example. The horizontal axis represents the crank angle and the vertical axis represents the lift amount of each valve. For description, the exhaust valve provided in the first exhaust opening portion 31A will be referred to as a "first exhaust valve" and the exhaust valve provided in the second exhaust opening portion 31B will be referred to as a "second exhaust valve".

The first exhaust valve is opened and closed at normal timings. That is, the first exhaust valve is opened near the exhaust bottom dead center and the first exhaust valve is closed near the exhaust top dead center. Before the first exhaust valve is opened, in a combustion and expansion stroke in the internal combustion engine 10, the temperature and the pressure in the cylinder 11 are increased. Therefore, a high-temperature and high-pressure blowdown stream is discharged at a high speed that is close to the speed of sound immediately after the first exhaust valve is opened. The blowdown stream in the initial stage of the exhaust stroke as described above is guided to the turbine 51 through the first exhaust pipe 30A.

The timing of opening of the second exhaust valve and the timing of closing of the second exhaust valve are later than the timing of opening of the first exhaust valve and the timing of closing of the first exhaust valve, respectively. Specifically, the second exhaust valve is opened near a time at which the blowdown caused by the first exhaust valve being opened ends and is closed near the exhaust top dead center. In the late stage of the exhaust stroke, a portion of the exhaust gas is not input to the turbine 51 and is discharged through the second exhaust pipe 30B.

The assist control according to the embodiment can be applied in the same manner to the configuration in the second modification example as described above. In this case, the exhaust cycle CE is determined based on the opening and closing of the first exhaust valve. In a case where the two-system exhaust path is present, exhaust energy input to the turbine 51 in one exhaust cycle CE becomes relatively small. Accordingly, the efficient switch control as illustrated in FIG. 6, which is performed in consideration of a change in in-turbine recovered work, is particularly effective.

What is claimed is:

1. An exhaust turbine power generating system comprising:
   an internal combustion engine;
   an exhaust turbine power generator configured to perform electric power generation by rotating a turbine by using exhaust gas from the internal combustion engine; and
   an electronic control unit configured to
      perform electric power generation control in which the exhaust turbine power generator is caused to perform electric power generation by controlling the exhaust turbine power generator, and
      perform powering control in which the exhaust turbine power generator is caused to perform powering such that the turbine is rotated by controlling the exhaust turbine power generator until a predetermined termination condition is satisfied after the internal combustion engine is started.

2. The exhaust turbine power generating system according to claim 1, wherein:
   the electronic control unit is configured to perform the powering control without performing the electric power generation control until a predetermined switch start condition is satisfied after the internal combustion engine is started; and
   the electronic control unit is configured to perform switch control in which the electric power generation control and the powering control are alternately performed until the predetermined termination condition is satisfied after the internal combustion engine is started and the predetermined switch start condition is satisfied.

3. The exhaust turbine power generating system according to claim 2, wherein:
   the electronic control unit is configured to perform the electric power generation control in at least a portion of a blowdown period of the internal combustion engine when performing the switch control;
   the blowdown period is a period within an exhaust cycle of the internal combustion engine in which a blowdown stream of the exhaust gas from an arbitrary cylinder in the internal combustion engine to the turbine is generated;
   the exhaust cycle is a period between two temporally consecutive exhaust start timings; and
   the exhaust start timing is a timing at which the exhaust gas starts to be discharged toward the turbine from an arbitrary cylinder in the internal combustion engine.

4. The exhaust turbine power generating system according to claim 3, wherein the electronic control unit is configured to change a timing to switch between the electric power generation control and the powering control in the switch control according to a rotation rate of the turbine.

5. The exhaust turbine power generating system according to claim 2, wherein:
   the predetermined switch start condition is a condition that a turbine rotation rate, which is a rotation rate of the turbine, reaches a switch start rotation rate; and
   the predetermined termination condition is a condition that the turbine rotation rate reaches a powering termination rotation rate that is greater than the switch start rotation rate.

6. The exhaust turbine power generating system according to claim 1, wherein the electronic control unit is configured to perform the electric power generation control without performing the powering control in a case where the predetermined termination condition is satisfied.

7. A control device for an exhaust turbine power generating system, the exhaust power generating system includes an internal combustion engine and an exhaust turbine power generator configured to perform electric power generation by rotating a turbine by using exhaust gas from the internal combustion engine, the control device comprising an electronic control unit configured to:
   perform electric power generation control in which the exhaust turbine power generator is caused to perform electric power generation by controlling the exhaust turbine power generator, and
   perform powering control in which the exhaust turbine power generator is caused to perform powering such that the turbine is rotated by controlling the exhaust turbine power generator until a predetermined termination condition is satisfied after the internal combustion engine is started.

* * * * *